United States Patent [19]

Fremgen

[11] Patent Number: 5,735,711
[45] Date of Patent: Apr. 7, 1998

[54] CABLE CONNECTOR

[75] Inventor: Dieter Fremgen, Wülfrath, Germany

[73] Assignee: Raychem GmbH, Ottobrunn, Germany

[21] Appl. No.: 605,183

[22] PCT Filed: Aug. 23, 1994

[86] PCT No.: PCT/GB94/01838

§ 371 Date: Feb. 27, 1996

§ 102(e) Date: Feb. 27, 1996

[87] PCT Pub. No.: WO95/06348

PCT Pub. Date: Mar. 2, 1995

[30] Foreign Application Priority Data

Aug. 27, 1993 [GB] United Kingdom ............. 9317837

[51] Int. Cl.⁶ ........................................... H01R 9/05
[52] U.S. Cl. ................... 439/578; 439/583; 439/535; 439/521; 174/59
[58] Field of Search .................... 439/579, 578, 439/580, 944, 942, 583, 584, 461, 462, 535, 536, 521, 718; 174/59

[56] References Cited

U.S. PATENT DOCUMENTS

| | | | |
|---|---|---|---|
| 1,862,811 | 6/1932 | Strong | 439/718 |
| 3,144,506 | 8/1964 | Gunthel, Jr. | 174/71 R |
| 3,836,696 | 9/1974 | Gressitt et al. | 174/41 |
| 3,951,490 | 4/1976 | Devendorf | 439/535 |
| 4,025,150 | 5/1977 | Nordberg et al. | 439/583 |
| 4,226,495 | 10/1980 | Palle et al. | 439/535 |
| 4,408,820 | 10/1983 | Eaby et al. | 439/655 |
| 4,605,815 | 8/1986 | Wilson | 174/59 |
| 4,835,659 | 5/1989 | Goodson | 361/724 |
| 5,006,960 | 4/1991 | Kallin et al. | 439/942 |

FOREIGN PATENT DOCUMENTS

| | | | |
|---|---|---|---|
| 0 024 022 A1 | 7/1980 | European Pat. Off. | H02G 3/16 |
| A-0051109 | 7/1981 | European Pat. Off. | |
| 0253670 A2 | 1/1988 | European Pat. Off. | |
| 0 432 904 A2 | 11/1990 | European Pat. Off. | H01R 9/05 |
| A-3127869 | 7/1981 | Germany | |
| 84 32 279 U | 3/1984 | Germany | H02G 15/113 |
| 3340943 | 5/1985 | Germany | |
| WO 88/05610 | 7/1988 | WIPO | H01R 9/00 |

*Primary Examiner*—Gary F. Paumen
*Assistant Examiner*—Tho Dac Ta
*Attorney, Agent, or Firm*—Herbert G. Burkard

[57] ABSTRACT

A connector (10) for joining coaxial or other cables includes an electronic or other connector (12) located in a housing (11). The housing has outlets (17) and (43) for a distribution cable carrying a signal, and outlets (19) for branch cables which take signals away from that cable to subscribers. The outlets (17)(43) may be separate from and are distinguishable from the branch outlets (19). The housing (11) may comprise a base portion (13) with at least one cover portion (14) or (11) which is releasably secured to the base portion by a snap connection to give easy access to the connectors (12) and cables.

8 Claims, 3 Drawing Sheets

CABLE CONNECTOR

BACKGROUND OF THE INVENTION

The present invention relates to cable connectors and in particular to CATV boxes or other connector devices used for splitting CATV signals from a distribution cable to subscribers.

Such devices generally have an outlet for a coaxial or other cable carrying an incoming signal, an outlet for passing a signal onto another such device or to a final subscriber, and one or more other outlets through which signals split off the incoming signal are passed to local subscribers. The first-mentioned and second-mentioned outlets are referred to herein an through outlets or outlets for connection to through cables, and said other outlets are referred to herein as drop outlets or outlets for connection to drop cables. The through cables will generally form part of a distribution cable and the drop cables will form part of subscriber cables.

Typical connectors are shown in Gebrauchsmuster G 84 32 279.9 (Stewing) and in EP-A-0051109 (Walter Rose GmbH & Co KG) in which the connectors have only four cable outlets, and the connectors are sealed and/or the cables are sealed to the connector housing by heat shrinkable connecting pieces.

When its desired to remove or to add a subscriber from or to the cable network, the heat shrinkable connecting piece may have to be damaged and/or removed to gain access to the electrical connector. DE-A3127869 (Elektro-und Gas-Armaturen-Fabrik GmbH provides a solution to part of this problem by incorporating a spare coaxial cable in the connector for future use by an additional subscriber.

Furthermore it may be difficult, if not impossible to seal and/or mechanically to fix the subscriber branch cables in a way that allows convenient removal.

SUMMARY OF THE INVENTION

The present invention can therefore allow a branch cable to be added or removed rapidly and economically.

According to one aspect of the invention there is provided a connector device for cables, comprising a housing and a connector (for example a box having coax outlets and containing electronic circuitry) for electrical interconnection of the cables located within the housing, characterized in that the housing has outlets for a through cable, which is separated from and distinguished from a plurality of outlets for drop cables.

Such an arrangement allows separate mechanical fixing and/or sealing for the through and for the drop or subscriber cables. The drop cables are preferably mechanically-fixed, preferably against axial pull and preferably as a group. This may be achieved by a single part of the housing gripping all of the drop cables substantially simultaneously. That part may comprise a cover removably fixed, preferably by hinging, snap (or other interference) fit and/or sliding to the housing, preferably to a base portion thereof. The cover preferably closes outlets that are otherwise open in cross-section, and which in the absence of the cover allow lateral insertion of the cables.

Preferably the housing comprises a base portion and at least one cover portion which sea jingly engages the base portion, preferably by sliding, especially telescopic relative movement, and is releasably secured thereto by a releasable snap, or other interference, connection.

Also according to the invention there is provided a connector device for joining cables and which comprises a housing having a connector for interconnection of the cables located therein, the housing comprising a base portion and at least one cover portion which sealingly engages the base portion, characterized in that the cover portion is releasably secured to the base portion by a snap, or other interference, connection.

The connector device preferably comprises a housing and an electronic connector for interconnection of cables located within the housing, the housing having at least two outlets for a through cable carrying a signal, and at least six drop cable outlets.

BRIEF DESCRIPTION OF THE DRAWINGS

The invention will be described by way of example and with reference to the accompanying drawings in which.

DESCRIPTION OF THE PREFERRED EMBODIMENTS

Figure 1:
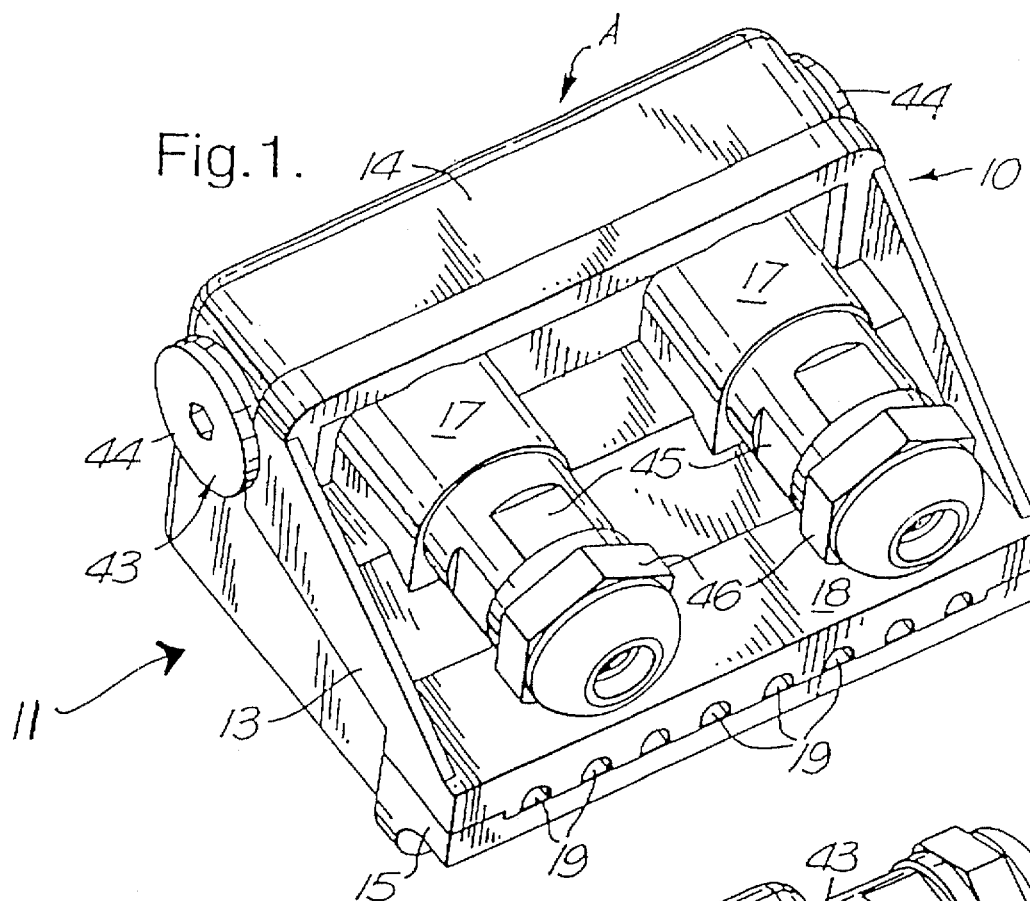
FIG. 1 is an isometric view of a connector device in an assembled condition in which the through cables are arranged for a butt connection.
Figure 2:
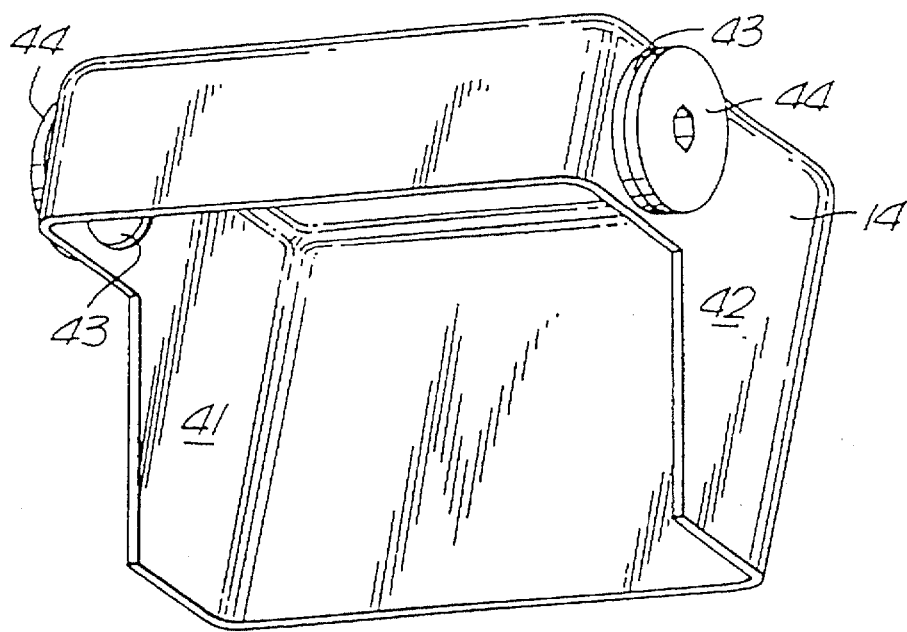
FIG. 2 is an isometric view of the connector device of FIG. 1 shown in exploded view taken in the direction of arrow A in FIG. 1.
Figure 2:
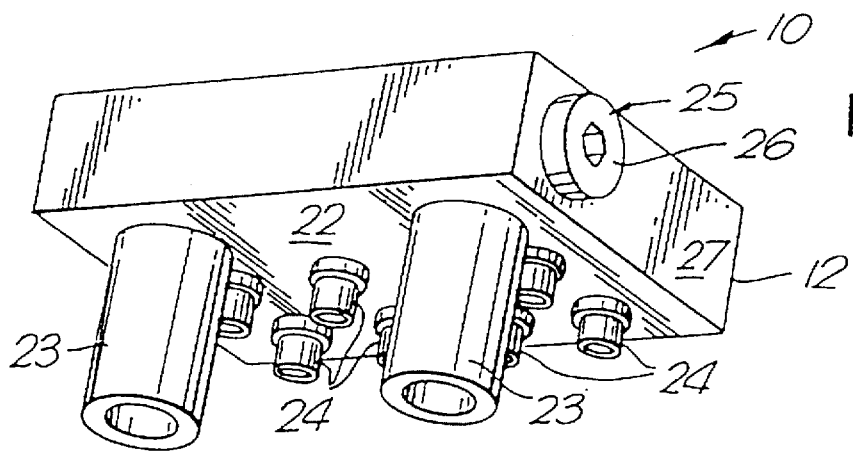
Figure 2:
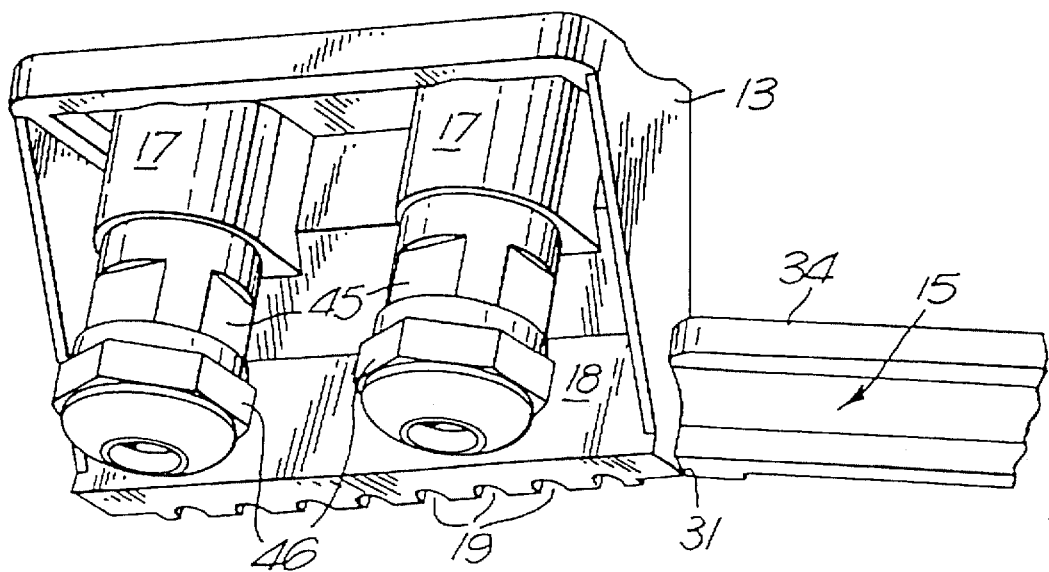
Figure 3:
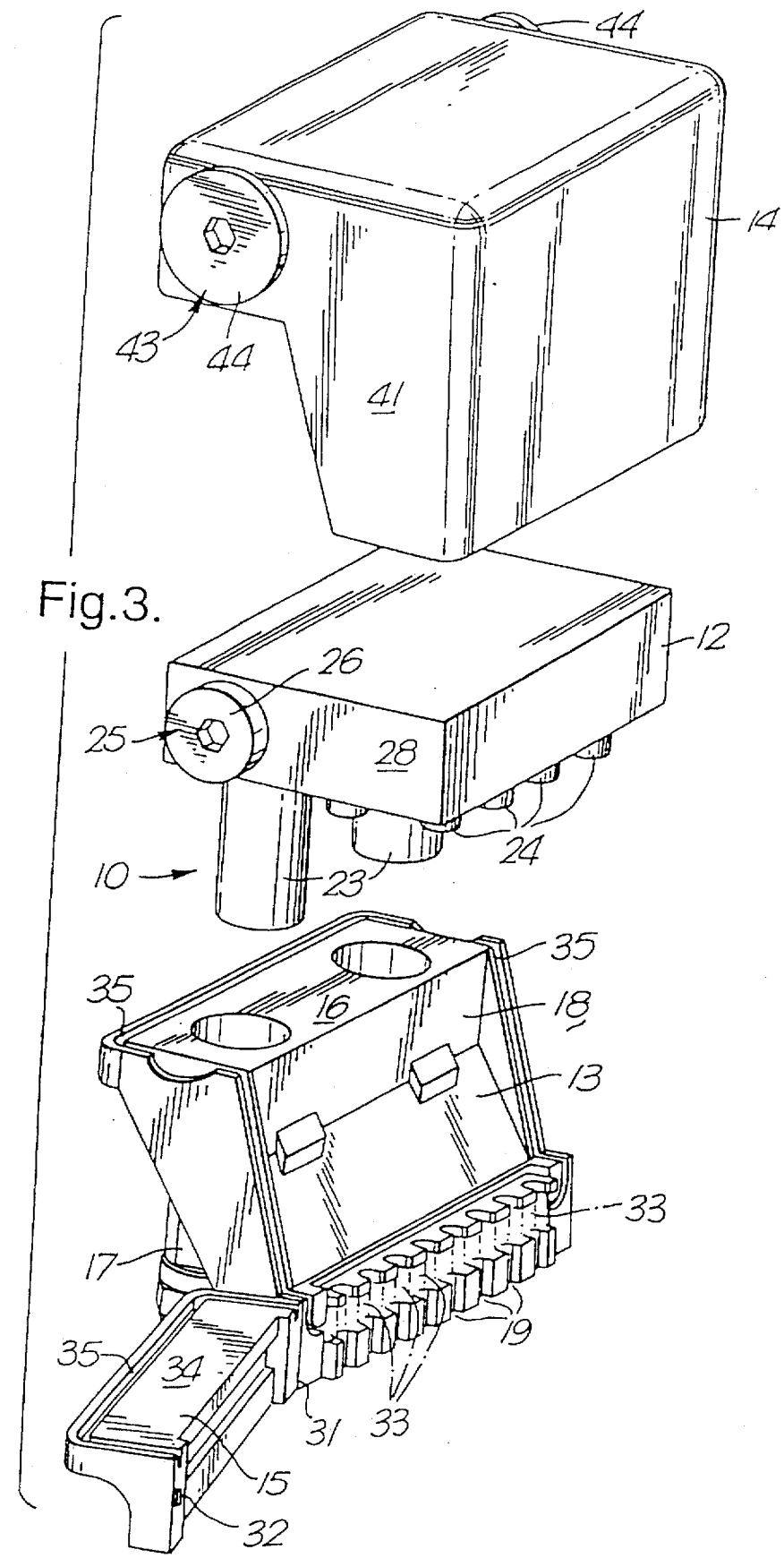
FIG. 3 is a second isometric exploded view of the connector in FIG. 1 taken in the opposite direction to that of arrow A.

With reference to FIGS. 1, 2 and 3 the connector 10 comprises a housing 11 in which an electrical connector 12 is located. The connector 12 may provide a simple electrical connection, but will preferably comprise electronic circuitry that splits an electronic signal from a distribution cable to one or more subscribers. The electronics may provide pre-determined signal attenuation and line impedances. In general, through and drop outlets will not be interchangeable due at least to the electronics within connector 12. Other features may, however, render them non-interchangeable such as size, orientation or markings on the housing to aid installation.

The connector 12 may therefore operate to interconnect ingoing and outgoing distribution cables which carry a signal and to at least one, and preferably up to eight subscriber cables. The connector 12 may be in the form of a block containing suitable connections and splitter electronics. The through cables may be received in two tubular outlets 23 on one face 22 of the block, and the drop cables may be received in outlets 24 also on said one face 22 of the block. Alternatively, the through cables may be received into outlets 25 at opposite ends 27, 28 of the block. In FIG. 2 and FIG. 3 these are shown blanked off by plugs 26. The outlets 25 are for use in in-line connections and the outlets 23 are for use in butt connections, and a single design of block can therefore be seen to be adaptable to butt or in-line splicing.

The housing 11 comprises a base portion 13, a first cover portion 14 and a second cover portion 15.

The base portion 13 has a substantially "L" shaped cross-section with one leg 16 of the "L" supporting tubular cable outlets 17 for the through cables. These outlets 17 may generally extend substantially parallel to the other leg 18 of the "L" shaped base portion where a butt splice is to be formed, as shown in FIG. 1. In the case of an in-line splice (see FIG. 4) the outlets 17 will extend parallel to the plane of that leg 16 and perpendicular to the direction of its length. Leg 16 may contain such outlets 17, or merely be shaped to accommodate outlets of a connector 12. At the distal end of the other leg 18, preferably on the side opposite the outlets 17, is a plurality of drop cable outlets 19. The drop outlets 19 are closed by the second cover portion 15 which may have one end connected to the base portion 13 by connection means such as a hinge 31 and another end of which may be a releasable snap fit or other connection 32 by means of which portion 15 may be held adjacent to the base portion. Thus the cover portion 15 when closed clamps the branch cables in the outlets 19, preferably providing axial-pull strength. The hinge 31 may be a plastics hinge formed integrally with or attached to the base portion 13 and/or to the cover portion 15. The outlets 19 may be environmentally sealed by sealing elements 33 when no drop cables are present, and in use can be sealed by means of a suitable sealing material such as a sealant, for example mastic, or an adhesive or a gel around individual drop cables.

The second cover portion 15 may have a flange 34 substantially perpendicular to its length so that when it is closed the base portion 13 and flange 34 form a "Z" shaped body which corresponds to the shape of the cover portion 14 and which receives the through connector outlets 23 in outlets 17. A groove 35 may extend around at least part of the periphery of the base portion 13 and flange 34. The groove may be filled with a suitable sealing material such as a sealant, adhesive, elastomeric ring, gel or gasket etc.

The first cover portion 14 may comprise a cover, an "L" shaped section, which is preferably matched to the base portion 13 to enclose the connector 12. Preferably the base portion 13 is a sliding fit within the cover portion 14, or vice-versa, such that the connector 12 becomes trapped between them and is preferably thereby substantially sealed from the environment. The lower edge (lower as shown in FIGS. 2 and 3) of the first cover portion 14 may therefore be received in the groove 35 and a resilient detent means may operate between the cover portion 14 and the base portion 13 to hold the cover portion to the base portion. Such a detent means could be provided by portions in the cover or base portion making a snap fit engagement with a detent of the other of the cover and base portions.

Each side wall 41, 42 of the cover 14 has a through cable outlet 43 therein, with which the outlets are preferably in alignment. The two outlets 43 may be closed by blank plugs 44 when not in use.

When the connector 11 is assembled the cover portion 14 may sealingly engage the groove 34, the cable outlets 43 may align with the outlets 25 in the connector 12, the tubular outlets 23 in the connector may be received in the tubular cable outlets 17, and the drop cable outlets 24 may face the drop cable outlets 19. The second cover portion 15 may then be closed, preferably after inserting drop cables into the open-sided outlets 19 to mate with outlets 24.

Therefore the drop outlets 24 to the connector 12 are accessible by removal of the first cover portion 14 and optionally by opening or removal of the cover portion 15.

The second cover portion 15 may be an independent snap fit or other cover that is removeable without prior removal of the first cover portion 14.

The through cable outlets 17 are preferably located away from and/or are perpendicular to the drop cable outlets 19. Thus the through cable outlets and drop cable outlets are easily distinguishable from each other, with all the drop cable outlets preferably being arranged side by side as one group and the through cable outlets being another group.

The through cable outlets 17 on the base portion may be threaded to receive an adapter 45 and a cable sealing and retaining means 46 which grips the external surface of the through cable both to seal the cable in the base portion and to provide axial-pull strength between a cable (not shown) and the connector 12.

Figure 4:
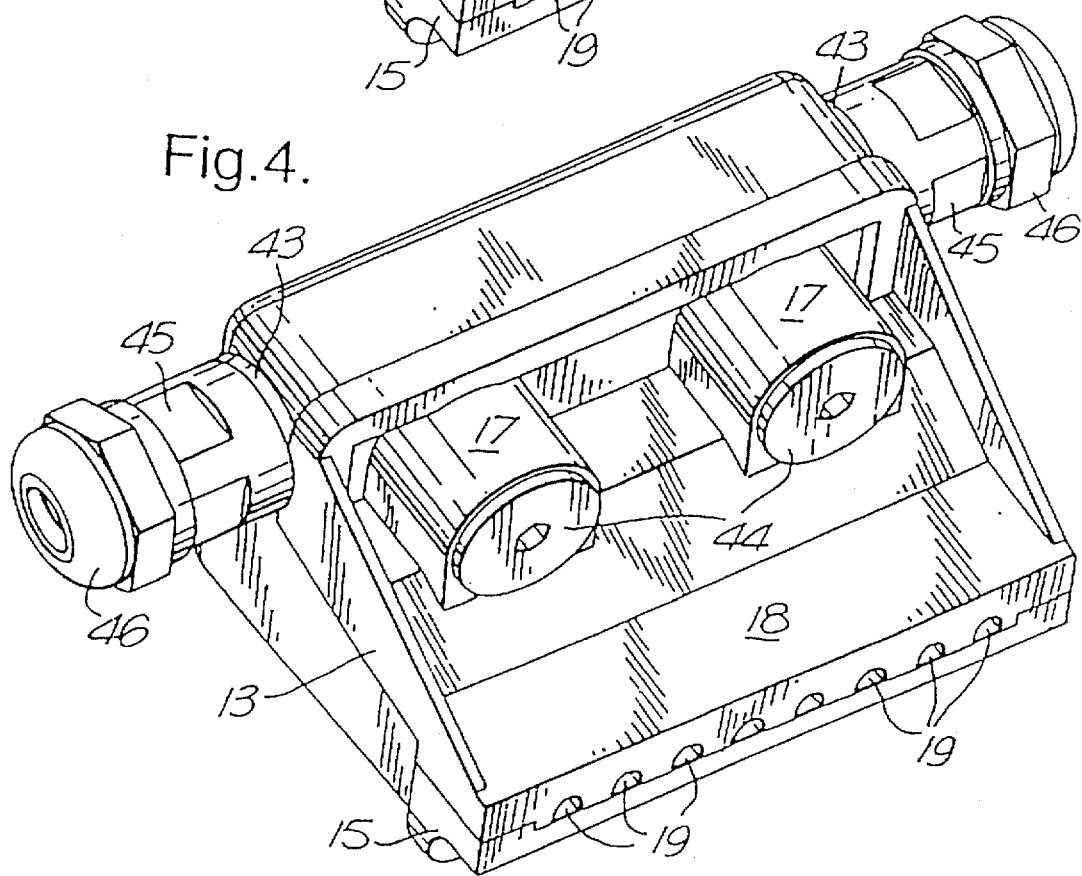
FIG. 4 is an isometric view of the connector device in an assembled condition in which the through cables are arranged for in-line connection.

With reference to FIG. 4, the only difference between this embodiment and that shown in FIG. 3 is that the blanking plugs 26 and 44 have been replaced with adaptors 45 and cable retainers 46 so that the connector 10 is suitable for use as an in-line connector.

It will be apparent that the connector 10 can be utilised as either a butt connector or an in-line connector merely be moving the blanking plugs 44 to close-off whichever of outlets 17, or 43 are not to be used. Similarly the outlets 23 and 25 on the electronic connector 12 are likewise closed to match the closed outlets in the housing 11. A kit may be provided comprising the connector and at least two such blanking plugs.

The first cover portion 14, base portion 13 and integral second cover portion 15 may be moulded from a plastics material such as nylon, or high density polyethylene. Any electronic or other circuitry within connector 12 may be shielded from interference by incorporating a metallic coating or metal surrounding inside cover portion 14 and/or base portion 13 or by manufacturing connector 12 from metal.

I claim:

1. A connector device for coaxial cables comprising a housing and a cable connector positioned within the housing for interconnection of the cables, the connector device characterized in that the housing includes a base portion, a first cover portion sealingly engaging the base portion and which is releasably affixed thereto by a releasable connection, and at least one outlet for a through cable which is separated from and distinguished from a plurality of outlets for drop cables, the drop cable outlets being formed in the base portion of the housing and being accessible through a second cover portion which is hinged at one side to the base portion and which makes a connection to another side thereof to the base portion.

2. A connector as claimed in claim 1, characterized in that the drop cable outlets are arranged in side by side relationship and are accessible independently of the through cable outlet.

3. A connector as claimed in claim 1, characterized in that the hinge cover portion also serves to clamp drop cables in the respective outlets in the base portion.

4. A connector device as claimed in claim 1, characterized in that the base portion also has supporting tubular cable outlets formed therein for the through cables.

5. A connector as claimed in claim 1, characterized in that it has two pairs of outlets for through cables, either pair being capable of being blanked off to form respectively an in-line connector or a butt connector.

6. A connector as claimed in claim 1, characterized in that a cable clamping device is provided that can transmit stress on a cable within an outlet to the outlet.

7. A connector as claimed in claim 1, characterized in that there is further provided a cover portion is received in a mating groove in the base portion, and through which a through cable connection to the connector is accessible.

8. A connector as claimed in claim 7, characterized in that the second cover portion that is received in the mating groove has a through cable outlet formed therein.

* * * * *